United States Patent [19]

Guilinger et al.

[11] Patent Number: 5,015,346
[45] Date of Patent: May 14, 1991

[54] ELECTROCHEMICAL METHOD FOR DEFECT DELINEATION IN SILICON-ON-INSULATOR WAFERS

[75] Inventors: Terry R. Guilinger; Howland D. T. Jones; Michael J. Kelly; John W. Medernach; Joel O. Stevenson; Sylvia S. Tsao, all of Albuquerque, N. Mex.

[73] Assignee: United States Department of Energy, Washington, D.C.

[21] Appl. No.: 506,734

[22] Filed: Apr. 10, 1990

[51] Int. Cl.$^5$ .......................... C25F 3/00; B23H 3/00
[52] U.S. Cl. .............................. 204/129.1; 204/129.3
[58] Field of Search .......................... 204/129.1, 129.3

[56] References Cited

U.S. PATENT DOCUMENTS

| 3,379,625 | 4/1968 | Csabi | 204/153.1 |
| 4,125,440 | 11/1978 | Markovits | 204/153.1 |
| 4,180,439 | 12/1979 | Deines et al. | 204/129.3 |
| 4,487,661 | 12/1984 | Barraud et al. | 204/153.1 |
| 4,514,436 | 4/1985 | Moerschel | 204/153.1 |

OTHER PUBLICATIONS

Ruska, W., "Microelectronic Processing", McGraw-Hill, New York, 1987, pp. 52–59.
K. Hiramoto et al., "The Behaviors of Metal Impurities in Si Substrate", *Ext. Abs. 174th Electrochemical Society Meeting*, Chicago, IL, Oct. 9–14, 1988, pp. 673–674.
K. Honda et al., "Catastrophic Breakdown in Silicon Oxides: The Effect of Fe Impurities At the SiO2-Si Interface", *Journal Applied Physics*, vol. 62, No. 5, Sep. 1, 1987, pp. 1960–1963.
Jenkins, "A New Preferential Etch for Defects in Silicon Crystals", *Journal Electrochemical Society*, vol. 124, No. 5, May 1977, pp. 757–762.
F. Secco d'Aragona, "Dislocation Etch For (100) Planes In Silicon", *Journal Electrochemical Society*, vol. 119, No. 7, 07/72, pp. 948–951.
V. Sirtl et al., "Chromsaure-Flussaure Als Spezifisches System Zur Atzgrubenentwicklung Auf Silizium", *Z. Metallkde*, vol. 52, 1961, pp. 529–531.
D. Schimmel, "A Comparison of Chemical Etches For Revealing (100) Silicon Crystal Defects", *Journal Electrochemical Society*, vol. 123, No. 5, May 1976, pp. 734–741.
J. Deines et al., "Correlation of Electrolytic-Etch and Surface-Photovoltage Techniques For the Detection of Electrically Active Defects In Silicon", *Applied Physics Letters*, vol. 34, No. 11, Jun. 1, 1979, pp. 746–749.

Primary Examiner—John F. Niebling
Assistant Examiner—K. Mayekar
Attorney, Agent, or Firm—Armand McMillan; James H. Chafin; William R. Moser

[57] ABSTRACT

An electrochemical method for defect delineation in thin-film SOI or SOS wafers in which a surface of a silicon wafer is electrically connected so as to control the voltage of the surface within a specified range, the silicon wafer is then contacted with an electrolyte, and, after removing the electrolyte, defects and metal contamination in the silicon wafer are identified.

5 Claims, 2 Drawing Sheets

ELECTROCHEMICAL METHOD FOR DEFECT DELINEATION IN SILICON-ON-INSULATOR WAFERS

BACKGROUND OF THE INVENTION

1. Field of the Invention

The present invention generally relates to an electrochemical method for the identification of defects and metal contamination in silicon wafers. More specifically, the present invention relates to an electrochemical method for defect delineation in thin-film silicon-on-insulator or silicon-on-sapphire wafers. The United States Government has rights in this invention pursuant to Contract No. DE-AC04-76DP00789 between the U.S. Department of Energy and AT&T Technologies, Inc.

2. Description of Related Art

Localized clusters of defects in silicon wafers are one of the most significant limiting factors for performance and yield in integrated circuit (IC) fabrication. As a result, identification and elimination of defects are crucial for process control. Defects in silicon include point defects generated during crystal growth as well as stacking faults, dislocations and precipitates generated during processing. In addition, active IC device regions must be completely cleaned, since metal impurities such as iron, copper and nickel impair oxide integrity, reduce carrier lifetime (Hiramoto et al, Ext. Abs., 174th Electrochem. Soc. Meeting, Chicago, 1988, Abs. No. 462), and contribute to high device leakage currents (Honda et al, *J. Appl. Phys.*, 62, 1960, (1987)). In silicon-on-insulator (SOI) fabrication, defects are generated by high fluence, high energy implantation (Separation by IMplanted OXygen-SIMOX or NItrogen-SIMNI) or by crystallization (Zone Melt Recrystallization-ZMR).

Conventional chemical defect delineation methods result in the bulk Si being etched at rates as high as 1–2 $\mu m/min$, as reported in Wright Jenkins ("A new preferential etch for defects in silicon crystals," *J. Electrochem. Soc.:* Solid State Science and Technology, May 1977, Vol. 124, No. 5, pp. 757–762), Secco (*J. Electrochem. Soc.:* Solid State Science and Technology, Vol. 119, p. 948 (1972)), Sirtl et al (*Z. Metallkd.*, Vol. 52, p. 529 (1961)), and Schimmel (*J. Electrochem. Soc.:* Solid State Science and Technology, Vol. 123, p. 734 (1976)). This etching rate is unacceptable for thin-film silicon-on-insulator (SOI) and silicon-on-sapphire (SOS) fabrication since the overlying Si layer may be as thin as 0.1 microns. Other conventional methods include the scanned-surface-photovoltage (SSP) technique which disadvantageously requires special instrumentation and is tedious when applied to large areas (Deines et al, "Correlation of electrolytic-etch and surface-photovoltage techniques for the detection of electrically active defects in silicon," *Appl. Phys. Lett.*, 34(11), June 1, 1979, pp. 746–748). Accordingly, it is desirable to provide an electrochemical method for defect delineation in wafers which does not etch bulk silicon and which does not suffer from the other above-noted disadvantages.

SUMMARY OF THE INVENTION

Therefore, it is an object of the present invention to provide a method for defect delineation in silicon wafers which does not significantly etch bulk silicon.

It is a further object of the present invention to provide a method for the identification of defects and metal contamination in SOI or SOS wafers.

The foregoing objects and others are accomplished in accordance with the present invention, generally speaking, by providing an electrochemical method for defect delineation in silicon wafers which includes electrically contacting a front surface of a silicon wafer so as to control the voltage of the front surface within a predetermined voltage range, contacting the silicon wafer with an electrolyte, electrochemically etching the silicon wafer, removing the electrolyte from the silicon wafer, and identifying defects associated with structure and metal contamination in the silicon wafer.

Further scope of the applicability of the method of the present invention will become apparent from the detailed description and drawings provided below. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is further illustrated in the accompanying drawings wherein.

DETAILED DESCRIPTION OF THE INVENTION

The electrochemical method of the present invention is preferably applicable to (100) oriented Si. The Si may be p-type or n-type, n-type being preferable. The Si may be doped with phosphorous, or other dopants such as arsenic, antimony, or boron, wherein the dopant concentration is in the range of from $10^{14}$ to $10^{16}/cm^3$ and preferably below $10^{15}/cm^3$. The etching solution of the present invention may be any acidic solution containing fluoride ions and is preferably hydrofluoric acid aqueous solution with a concentration in the range of about 1 to 49 wt %, and preferably about 5 wt %.

An electrode configuration is electrically connected with the front side of the silicon wafer which is controlled in the range of from about 0.1 to 12 volts, preferably from +3 to +5 volts versus a $Cu/CuF_2$ reference electrode. The electrode configuration may be a two-, three- or four-electrode configuration and is preferably a three-electrode configuration. A front side contact for SOI wafers is used to avoid potential drop due to the presence of the insulator between the front and back sides of the wafer. Materials for ohmic contact to the front side of the wafer include for example aluminum, platinum, indium, nickel, or gold, and indium solder is preferably used. The ohmic contact material must not be contacted by the etching solution.

EXAMPLES

Figure 1:
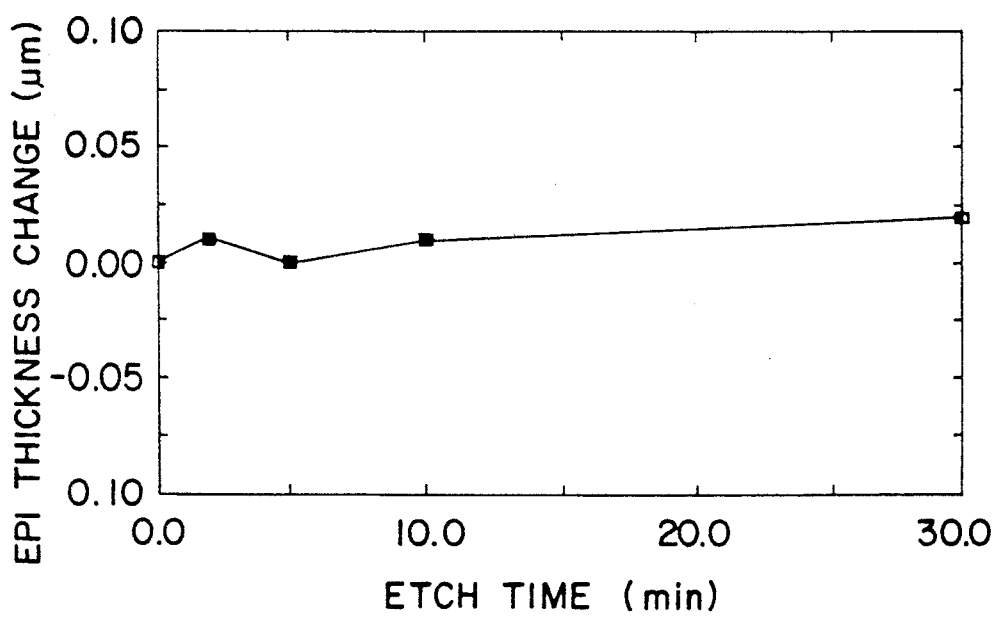
FIG. 1 is a graph showing the change of epi thickness (microns) over etch time (min.)

In order to show that the electrochemical method of the present invention does not etch bulk silicon in contrast to conventional methods such as Wright Jenkins (with a bulk Si etch rate of 1 $\mu m/min$), Fourier Transform Infrared (FTIR) spectroscopy measurements of n.

epitaxial silicon on n+ substrate before and after electrochemical etching were conducted. Within the uncertainty of the FTIR measurements, there was no evidence of bulk silicon etching for electrochemical etch times up to 30 minutes as shown in FIG. 1 which indicates the change in epi thickness (microns) over etch time (min). As is evident from FIG. 1, the change in epi thickness is not a function of etch time. This property of the electrochemical method of the present invention makes it ideal for thin film SOI and SOS wafers. Electron microscopy of etched wafers shows that the electrochemical etch produces crystallographic etch pits, 2-50 microns in size, formed in discrete regions of high electrochemical activity. Further, spreading resistance profiles indicate that dopant atoms are not selectively etched by this procedure. Electrochemical etch pits do correlate with both structural and impurity defects. Crystallographic etch pits at both ends of oxidation-induced stacking faults and etch pit densities increasing with increasing iron contamination under controlled conditions were also observed.

Figure 2:
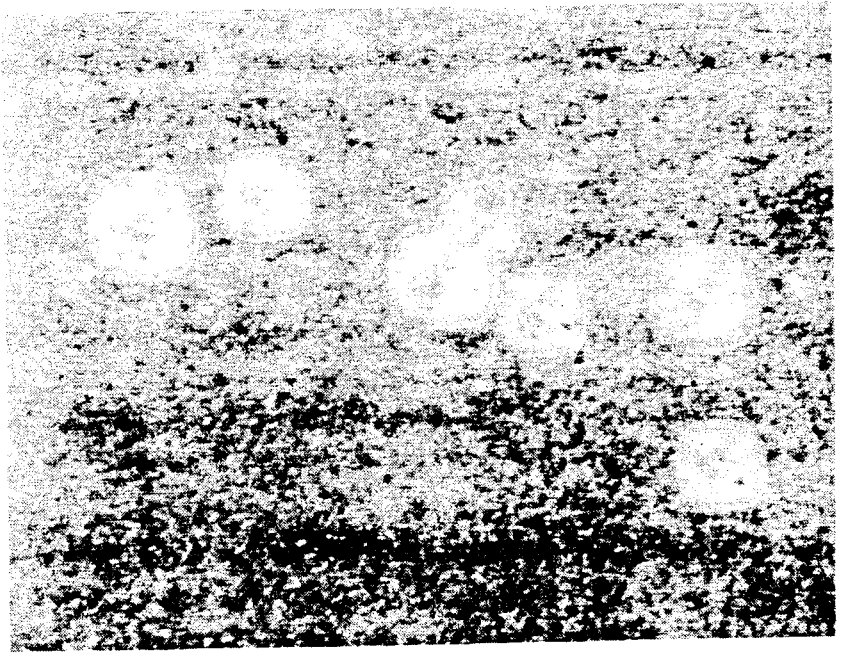
FIG. 2 is a photograph showing etch pits in a SIMOX wafer magnified 400 times wherein the etch pit density is $10^4$–$10^5/cm^2$.

As specific examples of preferred embodiments of the electrochemical method of the present invention, this method was used to delineate defects in SIMOX and ZMR SOI wafers. The SIMOX wafers constituted 0.4 $\mu$m n$^-$ Si/0.4 $\mu$m SiO$_2$ formed by 150 keV, $1.7 \times 10^{18}$ O$^+$/cm$^2$ implant followed by 5 hours of annealing at 1275° C. Epitaxy was used to thicken as the implanted 0.1 $\mu$m Si layer to the final 0.4 $\mu$m thickness. ZMR (0.4 $\mu$m n$^-$ Si/1.2 $\mu$m SiO$_2$) SOI wafers were also prepared. In the ZMR wafers, grain boundaries along the (100) direction were delineated. Square etch pits associated with the grain boundaries were parallel with the (110) direction. These grain boundaries were about 100 $\mu$m apart. For the SIMOX wafers, electrochemical etch pit densities ranged from $10^4$-$10^8$/cm$^2$ as illustrated in FIG. 2. This compares to pit densities less than 10/cm$^2$ on bulk n$^-$ Si.

The invention being thus described, it will be obvious the same may be varied in many ways. Such variations are not to be regarded as a departure from the spirit and scope of the invention and all such modifications as would be obvious to one skilled in the art are intended to be included within the scope of the following claims.

What is claimed:

1. An electrochemical method for defect delineation in silicon-on-insulator wafers which comprises:
   electrically contacting a front surface of said wafer so as to control the voltage of said front surface within a 0.1 to 12 volts range;
   contacting said silicon wafer with an electrolyte solution;
   electrochemically etching said silicon wafer;
   removing said electrolyte from said silicon wafer; and
   identifying defects and metal contamination in said silicon wafer.

2. The electrochemical method of claim 1, wherein the silicon wafer is a (100) oriented n-type silicon wafer.

3. The electrochemical method of claim 1, wherein the voltage range is from +3 to +5 volts in a three-electrode configuration versus a Cu/CuF$_2$ reference electrode.

4. The electrochemical method of claim 1, wherein the silicon wafer has a dopant concentration of up to about $10^{15}$/cm$^3$.

5. The electrochemical method of claim 1, wherein the electrolyte is hydrofluoric acid.

* * * * *